J. GIBSON, Jr.
Street Car Heater.
No. 3,029. Reissued July 14, 1868.
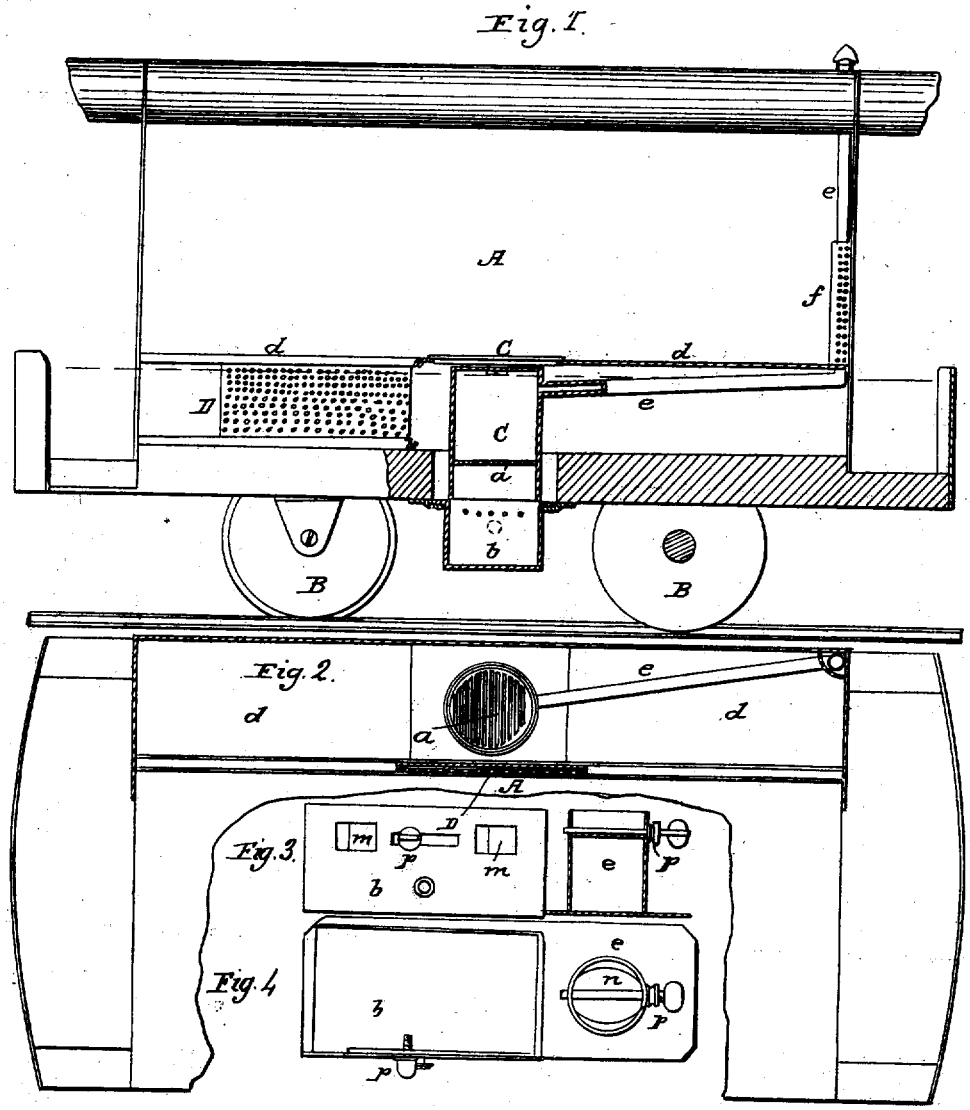
Witnesses:
G. A. Jackson
Jas. R. Lucas.
Inventor:
John Gibson
Per Munn & Co
Attorneys.
N. PETERS, Photo-Lithographer, Washington, D. C.

UNITED STATES PATENT OFFICE.

JOHN GIBSON, JR., OF ALBANY, NEW YORK.

IMPROVEMENT IN STREET-CAR HEATERS.

Specification forming part of Letters Patent No. 60,714, dated January 1, 1867; Reissue No. 3,029, dated July 14, 1868.

*To all whom it may concern:*

Be it known that I, JOHN GIBSON, JR., of the city and county of Albany, and State of New York, have invented a new and improved mode of heating cars or other traveling conveyances; also small apartments—such as railroad "switch-houses" and the like—where room must be economized; and I do hereby declare that the following is a full and exact description thereof, which will enable others skilled in the art to make and use the same, reference being had to the accompanying drawings, forming part of this specification, in which—

Figure 1 is a central longitudinal section of a car or any room to be heated, showing the heating apparatus. Fig. 2 is an inverted view of a horizontal section through the fire-grate. Figs. 3 and 4 are detached views of draft-doors and damper with their pinch-screws connected.

Similar letters indicate like parts.

The object of this invention is to warm cars or any traveling conveyance or small apartments—such as railroad switch-houses and the like—where room must be economized, which is accomplished by placing one or more stoves or heaters, C, anywhere under the seat *d*, as shown in the car or room A, Fig. 1.

The grate *a* and ash-pan *b* may (according to the nature of the room to be warmed) be placed and operated below the floor or from the outside, as shown in Fig. 1. The ash-pan *b*, Fig. 3, is provided with one or more adjustable draft-doors, *m m*, which are held secure in place (when adjusted) by the pinch-screw P or its equivalent. Any suitable fuel may be used, and fed into the stove or heater through the top or at the side, as most convenient.

To make available the heat from the smoke-pipe *e*, the said pipe is made to pass along under the seat *d* from the heater C to one corner of the seat or apartment, thence upward, as in Fig. 1; or the pipe *e* may be made to pass from under the first seat downward and across (either under or near the floor) to and under a second seat, and then along under such second seat to its farthest end, thence outward or upward to its exit. The heater C and pipe *e* may be incased under the seat in whole or in part, or additional warm-air pipes may be connected with the heater and arranged under the seat to provide and throw off the greatest amount of heat below the line of the seat or seats; and when the stove or heater C and the smoke-pipe *e*, with any other warm-air pipes, are so arranged under the seat or seats the room or apartments A, Fig. 1, will yet furnish as much space for human occupancy as if no heating apparatus were in such room, and the apartment will be thoroughly warmed and at the proper point near the floor.

To aid in regulating the heat a "check-damper," *n*, is placed in the pipe *e*, at the highest convenient point, near the ceiling or roof, which damper, when set, is securely held by a pinch-screw, P, or its equivalent.

A protecting "shield," *f*, Fig. 1, is placed around the pipe *e* above the seat, and a metal "protection-piece," D, composed of one or more thicknesses with air-spaces between, or any other equivalent non-conducting arrangement, is placed over and in front of the heater C to protect from excessive heat; and the said protection-piece D, or equivalent, when placed in front of the heater, serves to spread the heat lengthwise under the seat.

The advantages of this invention over any other arrangement for heating cars or other traveling conveyances, railroad switch-houses, or the like, (where it is desirable to economize space,) are these: First, they can be thoroughly warmed, and their entire area may be used and made available the same as if the said heating apparatus were not present or in use; second, by this arrangement all the heat as generated is kept below the line of the seat until there diffused, and then spread across the floor; third, persons standing near, or even those seated directly over the "heating apparatus," experience no discomfort from excess of heat; fourth, the heat may be regulated, and in traveling conveyances may be secured from unintentional change or variation by jolting or accident.

Having described the principle of the construction and applications of my invention, what I claim as new, and desire to secure by Letters Patent, is—

1. The stove or heater C and smoke-pipe *e*, incased or not in whole or in part, either without or connected with other suitable heating-pipes, (other than steam-pipes,) when arranged under the seat of any traveling conveyance or in a room under a seat, for the purpose set forth and described.

2. The protection-piece D, constructed and arranged as described, or its equivalent, for the purposes set forth, as specified.

3. The pinch-screw P, or its equivalent, in combination with the draft-doors M M, as and for the purposes specified.

JOHN GIBSON, JR.

Witnesses:

ALEX. SELKIRK,

J. H. GIBSON.